(12) United States Patent
Al-Araji et al.

(10) Patent No.: US 7,099,588 B2
(45) Date of Patent: Aug. 29, 2006

(54) LASER MODULATION CONTROL TO IMPROVE SYSTEM DYNAMIC RANGE

(75) Inventors: Saleh R. Al-Araji, Alpharetta, GA (US); John Skrobko, Berkeley Lake, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 682 days.

(21) Appl. No.: 10/213,632

(22) Filed: Aug. 6, 2002

(65) Prior Publication Data
US 2004/0028413 A1 Feb. 12, 2004

(51) Int. Cl.
*H04B 10/00* (2006.01)

(52) U.S. Cl. .............. 398/115; 398/116; 398/202; 398/203; 398/204

(58) Field of Classification Search ............. 398/115, 398/116, 118, 202–214
See application file for complete search history.

(56) References Cited

U.S. PATENT DOCUMENTS 5,331,453 A * 7/1994 Lipsky ................ 398/204

\* cited by examiner

*Primary Examiner*—David C. Payne

(57) ABSTRACT

The present invention provides several embodiments of a video carrier signal detection circuit included in an optical transmitter for either disabling an oscillator that provides dithering tones or attenuating the power level of the dither tones. A first detection circuit detects the presence of a video carrier signal by analyzing a known video channel. The power level of a video sync pulse included in the known video channel is then compared to a reference power level. A second detection circuit compares the composite power level of the RF signals in a predetenmined frequency spectrum with a reference power level to determine either the presence of a video carrier signal or an increase in the channel loading. Upon detection of a video carrier signal or an increase in composite power, an enable signal is provided to either the oscillator or an attenuating device depending upon the detection circuit.

14 Claims, 6 Drawing Sheets

LASER MODULATION CONTROL TO IMPROVE SYSTEM DYNAMIC RANGE

FIELD OF THE INVENTION

This invention relates generally to broadband communications systems, such as cable television networks, and more specifically to an optical transmitter including a spurious noise mitigator circuit that is suitable for use in the broadband communications system.

BACKGROUND OF THE INVENTION

FIG. 1 is a block diagram illustrating an example of one branch of a conventional broadband communications system, such as a two-way hybrid fiber/coaxial (HFC) network, that carries optical and electrical signals. Such a network may be used in a variety of systems, including, for example, cable television networks, voice delivery networks, and data delivery networks to name but a few. The communications system 100 includes headend equipment 105 for generating forward, or downstream, signals (e.g., voice, audio, video, or data signals) that are transmitted to subscriber equipment 145. Initially, the forward signals are transmitted via optical transmitters (not shown) as optical signals along a first communication medium 110, such as a fiber optic cable. In most networks, the first communication medium 110 is a long haul segment that carries light having a wavelength in the 1550 nanometer (nm) range. The first communication medium 110 carries the forward signal to hubs 115, which include equipment that transmits the optical signals over a second communication medium 120. In most networks, the second communication medium 120 is an optical fiber that is designed for shorter distances, and which carries light having a wavelength in the 1310 nm range.

From the hub 115, the signals are transmitted to an optical node 125 including an optical receiver and a reverse optical transmitter. The optical receiver converts the optical signals to radio frequency (RF), or electrical, signals. The electrical signals are then transmitted along a third communication medium 130, such as coaxial cable, and are amplified and split, as necessary, by one or more distribution amplifiers 135a–c positioned along the communication medium 130. Taps 140 further split the forward signals in order to provide signals to subscriber equipment 145, such as set-top terminals, computers, telephone handsets, modems, televisions, etc. It will be appreciated that only one branch of the network connecting the headend equipment 105 with the plurality of subscriber equipment 145 is shown for simplicity. However, those skilled in the art will appreciate that most networks include several different branches connecting the headend equipment 105 with several additional hubs 115, optical nodes 125, amplifiers 135a–c, and subscriber equipment 145.

In a two-way network, the subscriber equipment 145 generates reverse RF signals, which may be generated for a variety of purposes, including video signals, e-mail, web surfing, pay-per-view, video-on-demand, telephony, and administrative signals from the set-top terminal. These reverse RF signals are typically in the form of modulated RF carriers that are transmitted upstream through the reverse path to the headend equipment 105. The reverse electrical signals from various subscribers are combined via the taps 140 and passive electrical combiners (not shown) with other reverse signals from other subscriber equipment 145. The combined reverse electrical signals are amplified by one or more of the distribution amplifiers 135a–c and typically converted to optical signals by the reverse optical transmitter included in the optical node 125 before being provided to the headend equipment 105. It will be appreciated that in the electrical, or RF, portion of the network 100, the forward and reverse electrical signals are carried along the same coaxial cable 130. In contrast, the forward and reverse optical signals on the first and second communications media 110, 120 are usually carried on separate optical fibers.

It is well known in the art that spurious noise exists on the optical link connecting the optical transmitter and the optical receiver. More specifically, spurious noise is generated from the interaction of the laser included in the transmitter with the rest of the optical link. Spurious noise comprises very fast noise beats that rise out of the general noise floor and is typically viewed at the optical receiver output with test equipment, such as a spectrum analyzer. The beats are a product of Rayleigh backscatter in the optical fiber creating brief external cavities. Spurious noise beats tend to cluster at low frequencies, but they may also concentrate at higher frequencies. Spurious noise, therefore, affects both data signals and video signals.

The most effective method of preventing spurious noise is to optically isolate the laser, thereby preventing backscattered photons from impacting the laser. Disadvantageously, however, the cost of an isolator is expensive and sometimes exceeds that of the laser. Optical attenuation can also be used to reduce, but not eliminate, spurious noise, however, at the cost of reduced optical power. A 5 dB optical attenuator at the laser improves spurious performance by about 10dB. Another method to reduce the effect of spurious noise is to modulate the laser to increase its linewidth. Accordingly, the peak intensity of the central mode is reduced, thereby reducing the amplitude of the spurious noise beats. This is typically a more cost effective method.

FIG. 2 is a block diagram of a conventional optical transmitter including an oscillator for introducing dithering tones, which is a method of reducing spurious noise by continuously modulating the laser. In this example, three dithering tones are introduced in the optical transmitter 200 and generally appear below the RF frequency range that is designated for signal transmission. For example, dithering tones are introduced at, for example, three different frequencies via a 3-tone oscillator 205 typically within the range from 0 MHz to 5 MHz, where the reverse RF frequency range is from 5 MHz to 45 MHz. After filtering via a lowpass filter 210, the three tones are then combined with the main input RF signal. Typically, the composite power of the tones is set to a level that gives the best system performance at low channel loading since the laser is not being modulated as often due to the limited number of services and the infrequent transmission of signals. As a result, in-band intermodulation products are disadvantageously generated as the channel loading increases. Additionally, the composite power of the dithering tones reduces the system dynamic range available to desired signals. As a general rule, the intermodulation products should be at least 40 dB below a digital carrier signal and 57dB below a video carrier signal.

Dithering tones are not recommended, however, when video carrier signals are present because the dithering tones affect the viewing quality and signal processing of the video signals. Additionally, dithering tones affect a high channel loading system, such as a system transmitting all digital channels. What is needed, therefore, is an effective and efficient method and apparatus of mitigating the effects of spurious noise particularly when video signals and signals in a high channel loading system are transmitted.

DETAILED DESCRIPTION OF A PREFERRED EMBODIMENT

The present invention will be described more fully hereinafter with reference to the accompanying drawings in which like numerals represent like elements throughout the several figures, and in which exemplary embodiments of the invention are shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. For example, the present invention is explained relative to the reverse path of a communications system; however, the present invention can also be used in the forward path. The present invention is described more fully hereinbelow.

The present invention is directed towards disabling the dithering tones when the presence of a video carrier signal is detected. A second embodiment of the present invention is directed towards disabling the dithering tones in accordance with any variation in the composite power level of the RF spectrum, e.g., from 5 MHz to 45 MHz. A further embodiment of the present invention is directed towards attenuating the dithering tones in accordance with the composite power level. Accordingly, the dithering tones are provided to mitigate the effects of spurious noise as recognized at the optical receiver until either a video carrier signal is received at the optical transmitter or the composite power level of the frequency spectrum exceeds a threshold level. In this manner, the dithering tones do not affect the quality of the signals. Additionally, the in-band intermodulation products are minimized and the system dynamic range of the frequency spectrum is maximized.

Figure 1:
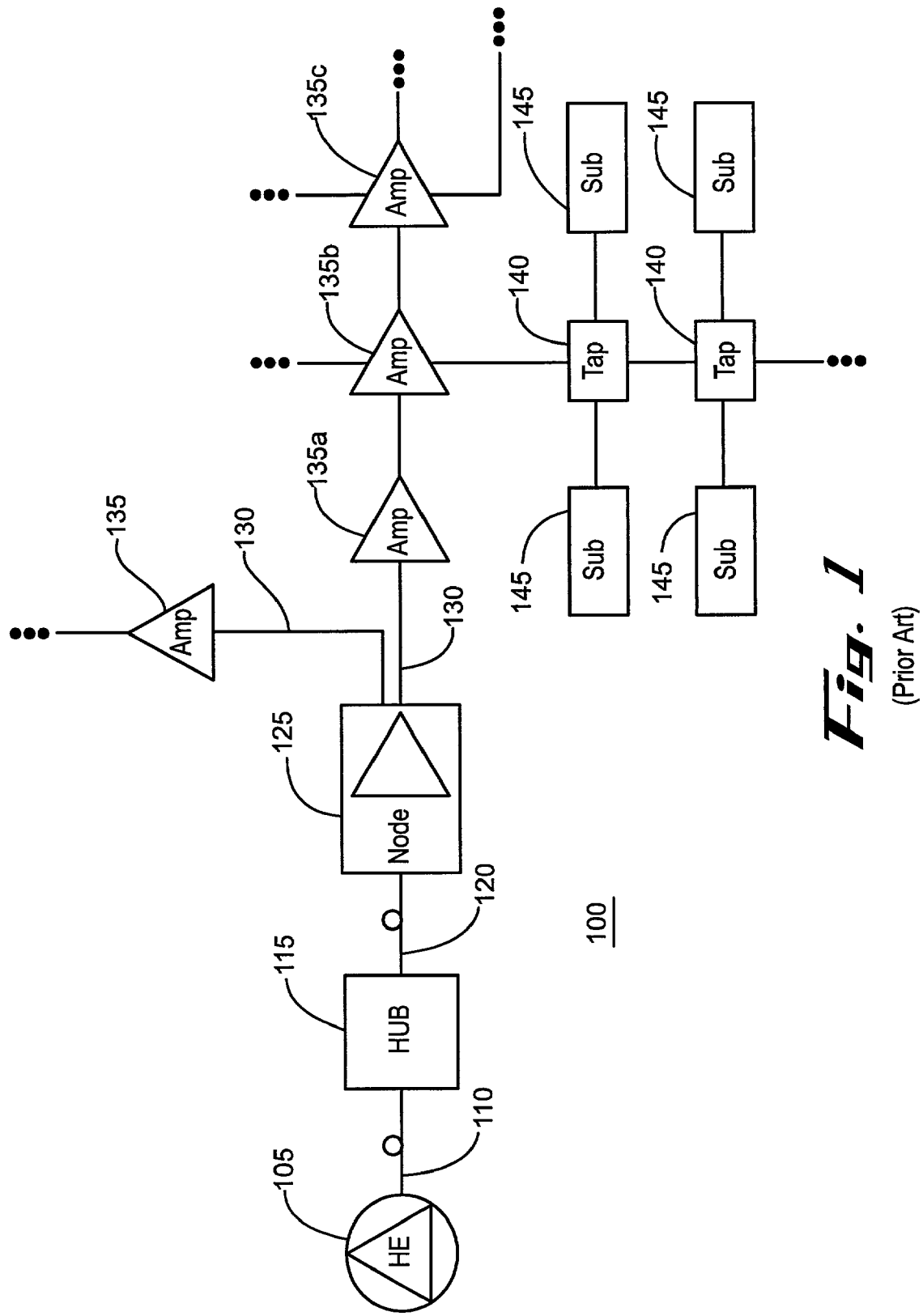
FIG. 1 illustrates an example of one branch of a conventional broadband communications network, such as a two-way HFC cable television network, that carries optical and electrical signals.
Figure 2:
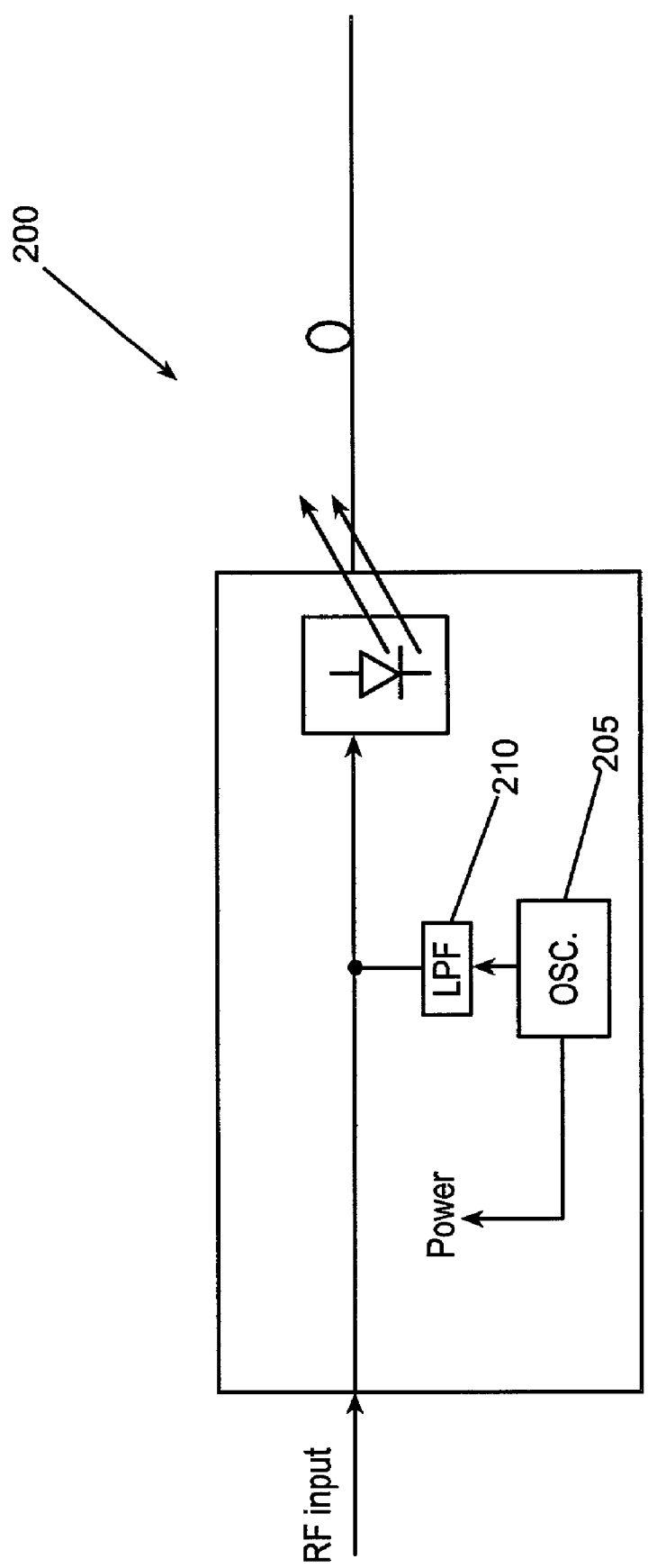
FIG. 2 is a block diagram of a conventional optical transmitter including an oscillator for introducing dithering tones, which is a method of reducing spurious noise by continuously modulating the laser.
Figure 3:
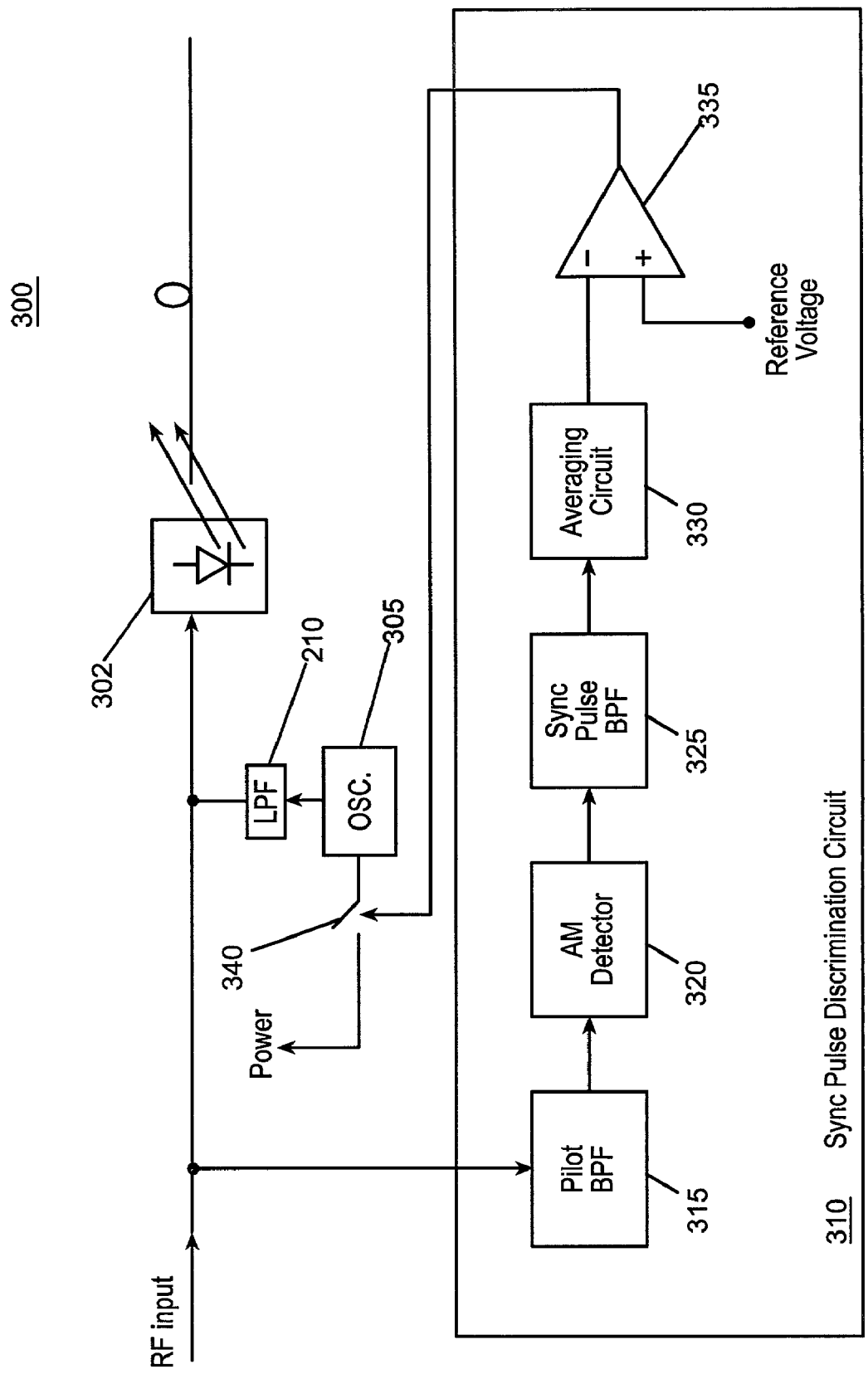
FIG. 3 is a block diagram of an optical transmitter including a sync pulse discrimination circuit in accordance with the present invention.

FIG. 3 is a block diagram of an optical transmitter including a sync pulse discrimination circuit in accordance with a first embodiment of the present invention. The optical transmitter 300 receives an RF input signal and provides an optical output signal. Also included is an oscillator 305 for providing dithering tones that are provided below the RF frequency spectrum. For example, dithering tones may be placed below 5 MHz when the reverse RF frequency spectrum is from 5 MHz to 45 MHz. In accordance with the present invention, the sync pulse discrimination circuit 310 controls the transmission of the dithering tones by turning on and off the oscillator 305. A strong power level at a known horizontal sync frequency is used to detect whether analog or digital modulation is present on the pilot carrier signal. In the case of analog modulation, which is typically indicative of a video signal, the frequency component is much stronger than that of digital modulation.

Figure 4:
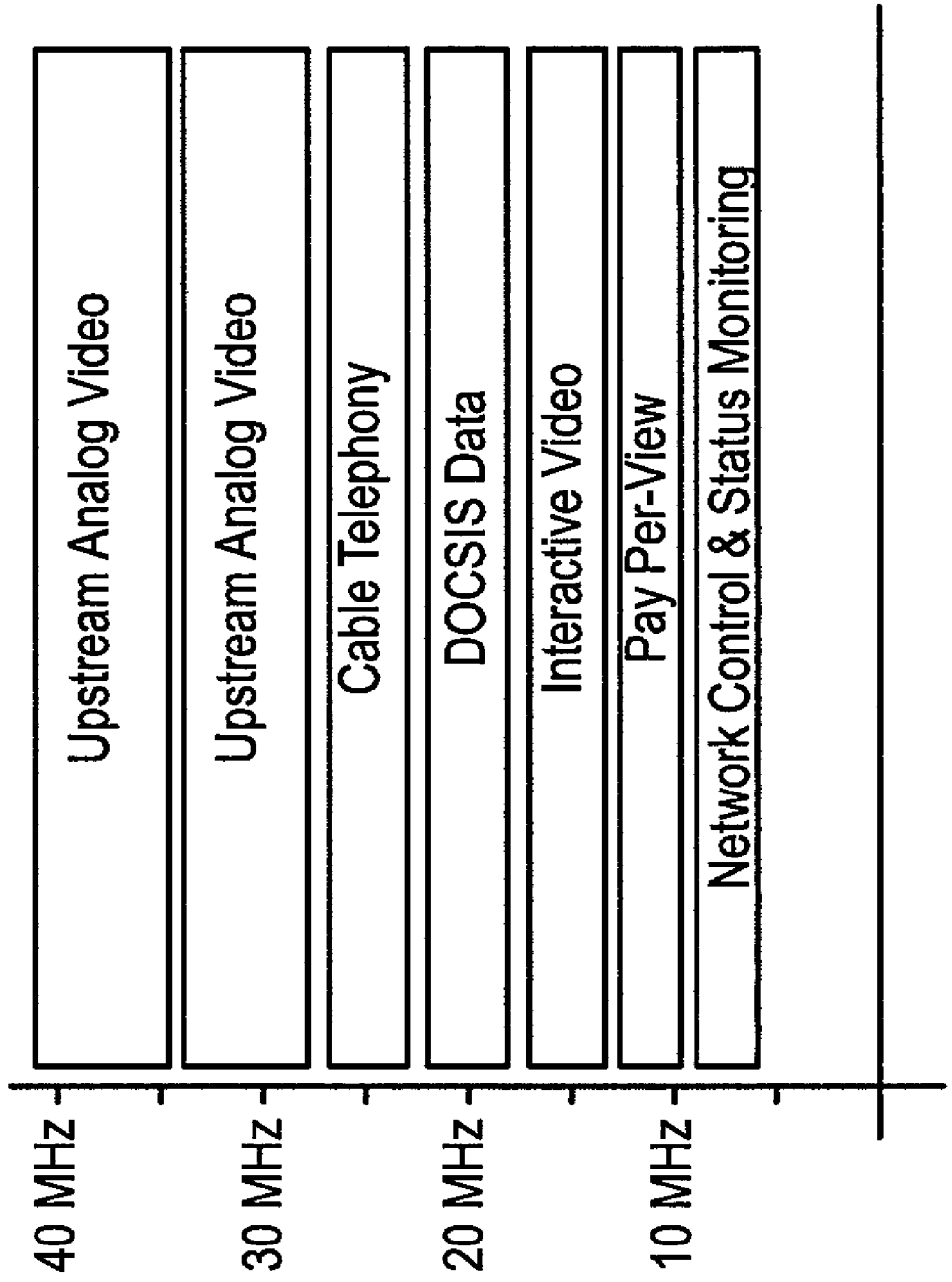
FIG. 4 illustrates a typical reverse band and the channels at different frequencies allocated to various services that may be used by the subscriber equipment for the purpose of sending reverse carrier signals.

Referring to FIG. 3, a portion of the RF input signal is provided to a pilot bandpass filter (BPF) 315 included in the sync pulse discrimination circuit 310. The BPF 315 is centered at the known center frequency, or channel, of the video carrier signal. FIG. 4 illustrates a typical reverse band and the channels at different frequencies allocated to various services that may be used by the subscriber equipment for the purpose of sending reverse carrier signals. As shown, upstream analog video signals may be sent around the center frequency 30 MHz. In this example, the BPF 315 is centered to pass the video signals at the 30 MHz channel.

Referring again to FIG. 3, the video carrier signal is assumed to be an RF carrier that is AM (amplitude modulation) modulated by an analog video signal. An AM detector 320, therefore, recovers the video signal in a known manner and provides the video signal to a sync pulse BPF 325. The sync pulse BPF 325 filters the demodulated video signal using a bandpass filter centered at the known horizontal sync frequency, such as, for example, 15.75 kHz for NTSC (National Television System Committee) cable systems. It will be appreciated that the horizontal sync frequency can be any frequency depending upon other analog formats, such as PAL (phase alteration by line) or SECAM (sequential component amplitude modulation). The filtered sync pulse is provided to an averaging circuit 330. The averaging circuit 330 averages the filtered sync pulse and provides a DC voltage that is then compared via comparator 335 to a reference voltage.

The voltage level of the reference voltage is set at the lowest expected sync pulse, or RF video signal level, so that any DC voltage above the reference voltage indicates the presence of a video signal. Accordingly, when a video signal is detected, an enable signal is provided to switch 340. The switch 340 opens thereby disabling the oscillator 305. In this manner, the sync pulse discrimination circuit 310 effectively turns off the dithering tones in order to preserve the signal quality of the video signal. It will be appreciated that the detection time must be less than the time it takes for the signal to travel through the transmitter to ensure that the oscillator 305 is disabled before the video signal modulates the laser.

Figure 5:
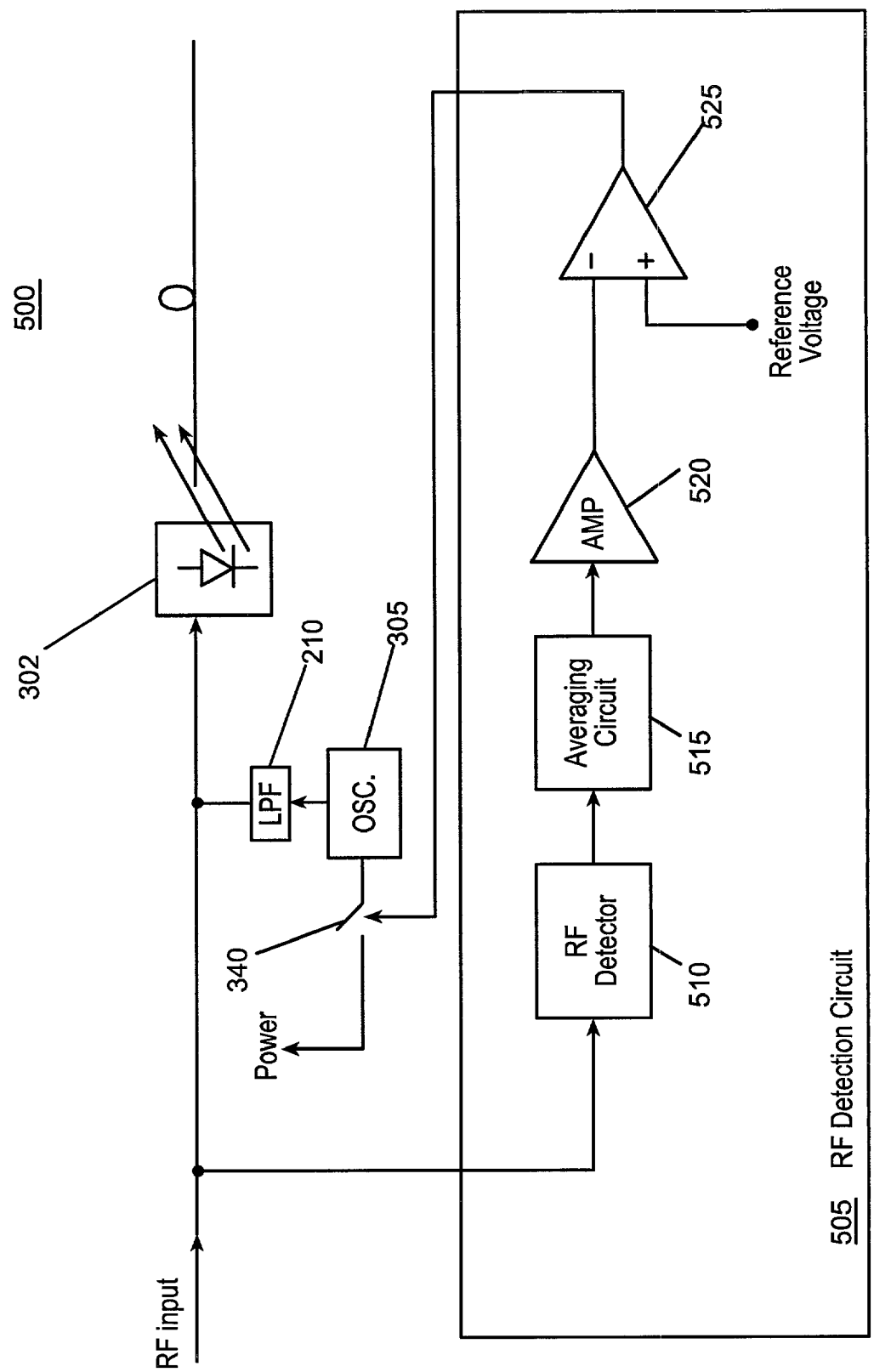
FIG. 5 is a block diagram of an optical transmitter including an RF detection circuit in accordance with the present invention.

FIG. 5 is a block diagram of an optical transmitter 500 including an RF detection circuit 505 in accordance with a second embodiment of the present invention. Accordingly, the RF detection circuit 505 reduces spurious noise by analyzing the composite power level over the entire RF frequency range (e.g., 5 MHz to 45 MHz). When the composite power level exceeds a threshold power level, a video signal may be present or the channel loading is high and the oscillator is disabled, thereby improving the system dynamic range.

A portion of the RF input signal is provided to an RF detector 510 included in the RF detection circuit 505. The RF detector 510 continuously analyzes the RF power level to determine the composite power level. The composite power level is then provided to an averaging circuit 515 for averaging. The DC averaged output is provided to an amplifier 520 for amplification. Subsequently, a comparator 525 compares the amplified DC output with a reference voltage. When the amplified DC output exceeds the reference voltage, an enable signal is provided to switch 340 to disable the oscillator 305.

Figure 6:
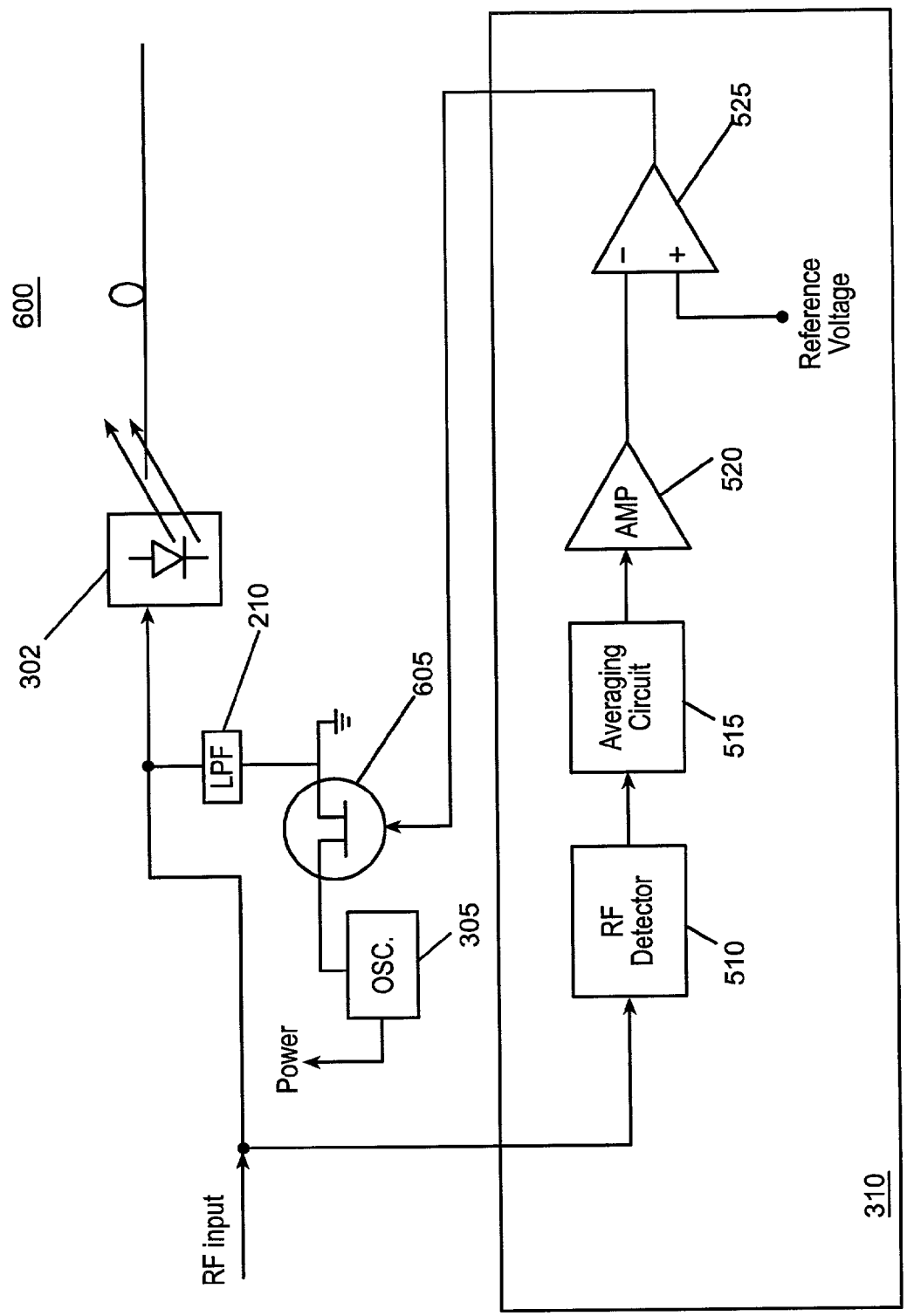
FIG. 6 is a block diagram of an optical transmitter including a tone adjustment circuit in accordance with a third embodiment of the present invention.

FIG. 6 is a block diagram of an optical transmitter including a tone adjustment circuit in accordance with a third embodiment of the present invention. In the third embodiment, the dithering tones are not completely disabled; however, they are attenuated in accordance with the composite power of the RF frequency spectrum. Controlled by the output of the comparator 525, a field effect transistor (FET) device 605 attenuates, or adjusts, the level of the dithering tones provided by the oscillator 305. Accordingly, the higher the power level of the RF frequency spectrum, the lower the power level of the tones. In this manner, as the power level increases, the intermodulation effect that degrades the system performance and video signal quality reduces. It will be appreciated that other attenuating or adjusting devices can replace the FET device 605 that achieves the same objective.

It is shown, therefore, several embodiments of mitigating the disadvantageous results of spurious noise while increasing the system dynamic range. In this manner, less expensive lasers having a broader range of specifications can be used in optical transmitters while mitigating the negative effects.

What is claimed is:

1. In a communications system for transmitting RF signals that are represented as an analog waveform, the RF signals including video and data carrier signals, the communications system including optical transmitters for receiving the RF signals and for transmitting optical RF signals to optical receivers via an optical link, the optical transmitter comprising:

an oscillator for providing dithering tones, wherein the dithering tones are combined with the received RF signals prior to providing the optical RF signals;

a sync pulse discrimination circuit for receiving a portion of the received RF signals, for detecting the presence of at least one video carrier signal included in the received RF signals, and for providing an enable signal in accordance with the presence of the at least one video carrier signal, wherein with the detection of the at least one video carrier signal, the enable signal disables the oscillator.

2. The communications system of claim 1, the sync pulse discrimination circuit comprising:

a pilot bandpass filter for filtering the portion of the received RF signals at a predetermined video channel;

an AM detector for recovering the video carrier signal from the filtered video signals;

a sync pulse bandpass filter for filtering the video carrier signal at a predetermined sync pulse frequency and for providing a sync pulse having a power level;

an averaging circuit coupled to the sync pulse bandpass filter for providing an averaged DC power level; and a comparator for comparing the averaged DC power level to a reference voltage, wherein the enable signal is provided when the averaged DC power level exceeds the reference voltage.

3. The communications system of claim 2, wherein the predetermined sync pulse frequency is 15.75 kHz.

4. The communications system of claim 1, the optical transmitter further comprising:

a switch controlled by the sync pulse discrimination circuit for disabling and enabling the oscillator in accordance with the enable signal.

5. The communications system of claim 1, wherein when the enable signal is provided, the optical receiver receives the optical RF signals absent the dithering tones.

6. In a communications system for transmitting RF signals that are represented as an analog waveform, the RF signals including video and data carrier signals, the communications system including optical transmitters for receiving the RF signals in a frequency spectrum and for transmitting optical RF signals to optical receivers via an optical link, the frequency spectrum having a composite power level, the optical transmitter comprising:

an oscillator for providing dithering tones, wherein the dithering tones are combined with the received RF signals prior to providing the optical RF signals;

an RF detection circuit for receiving a portion of the received RF signals, for determining the composite power level of the frequency spectrum, for comparing the composite power level with a reference power level, and for providing an enable signal when the composite power level is greater than the reference power level, wherein when the composite power level is greater than the reference power level, wherein the enable signal disables the oscillator.

7. The communications system of claim 6, the RF detection circuit comprising:

an RF detector for receiving the portion of the RF signals in the frequency spectrum and for providing the composite power level;

an averaging circuit for averaging the composite power level and for providing an averaged DC power level; and a comparator for comparing the averaged DC power level with the reference power level.

8. The communications system of claim 7, the RF detection circuit further comprising:

an amplifier coupled to the averaging circuit for amplifying the averaged DC power level.

9. The communications system of claim 6, the optical transmitter further comprising:

a switch controlled by the RF detection circuit for disabling and enabling the oscillator in accordance with the enable signal.

10. The communications system of claim 6, wherein when the enable signal is provided, the optical receiver receives the optical RF signals absent the dithering tones.

11. In a communications system for transmitting RF signals that are represented as an analog waveform, the RF signals including video and data carrier signals, the communications system including optical transmitters for receiving the RF signals in a frequency spectrum and for transmitting optical RF signals to optical receivers via an optical link, the frequency spectrum having a composite power level, the optical transmitter comprising:

an oscillator for providing dithering tones having a power level, wherein the dithering tones are combined with the received RE signals prior to providing the optical RF signals;

an RE detection circuit for receiving a portion of the received RE signals, for determining the composite power level of the frequency spectrum, for comparing the composite power level with a reference power level, and for providing an enable signal when the composite power level is greater than the reference power level, wherein when the composite power level is greater than the reference power level; and an attenuating device controlled by the enable signal for attenuating the power level of the dithering tones prior to being combined with the RE signals.

12. The communications system of claim 11, the RF detection circuit comprising:
    an RF detector for receiving the portion of the RF signals in the frequency spectrum and for providing the composite power level;
    an averaging circuit for averaging the composite power level and for providing an averaged DC power level; and
    a comparator for comparing the averaged DC power level with the reference power level.

13. The communications system of claim 12, the RF detection circuit further comprising:
    an amplifier coupled to the averaging circuit for amplifying the averaged DC power level.

14. The communications system of claim 11 wherein when the enable signal is provided, the optical receiver receives the optical RF signals with attenuated power levels of the dithering tones.

* * * * *